April 23, 1968  H. N. ANDREWS ET AL  3,379,619
FUEL ASSEMBLY FOR NUCLEAR REACTORS
Filed May 25, 1966  3 Sheets-Sheet 1
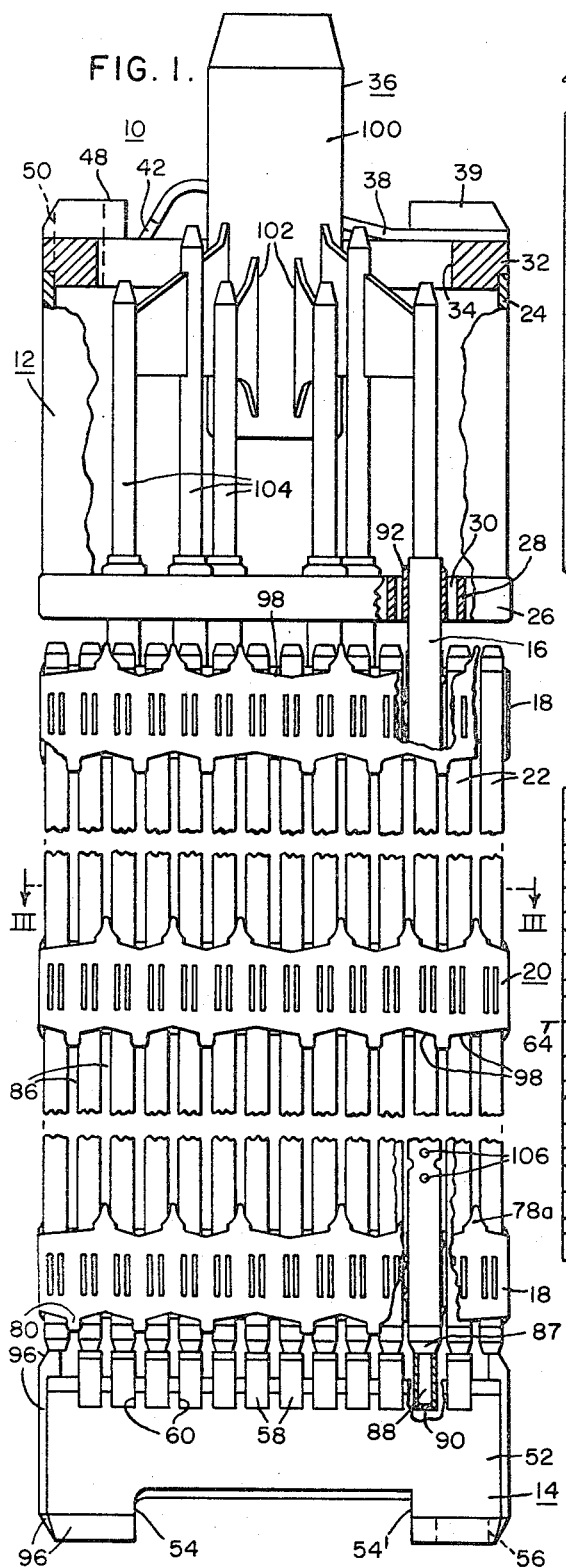
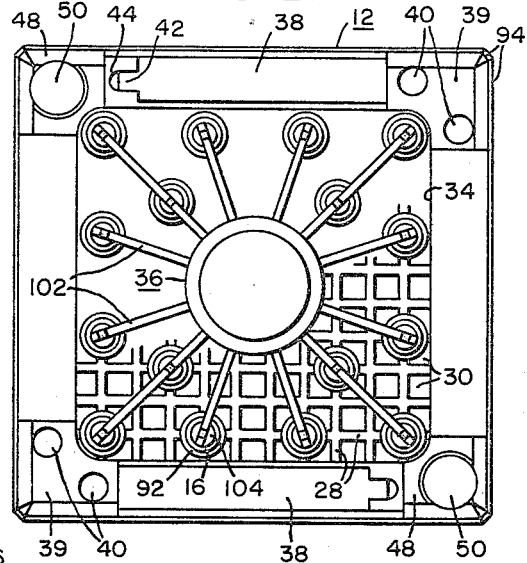
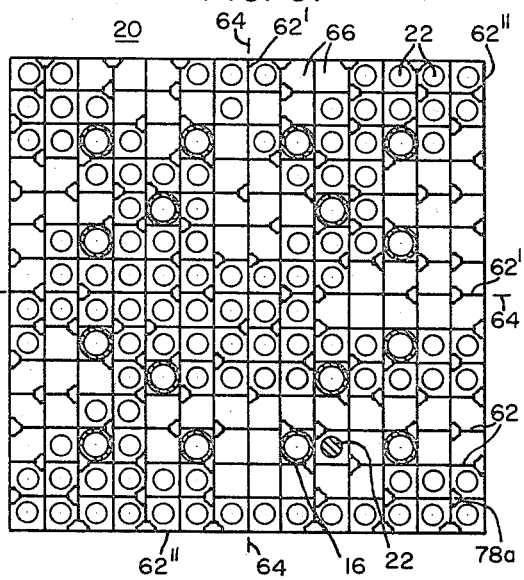
INVENTORS
Harry N. Andrews &
Faust N. Vespa.
BY
A. J. Santantonio
ATTORNEY

United States Patent Office 3,379,619
Patented Apr. 23, 1968

3,379,619
FUEL ASSEMBLY FOR NUCLEAR REACTORS
Harry N. Andrews, Pitcairn, and Faust N. Vespa, Wilkins Township, Pittsburgh, Pa., assignors to Westinghouse Electric Corporation, Pittsburgh, Pa., a corporation of Pennsylvania
Filed May 25, 1966, Ser. No. 552,900
13 Claims. (Cl. 176—78)

ABSTRACT OF THE DISCLOSURE

This invention is directed to nuclear fuel element assemblies wherein the fuel elements are held in a closely packed, yet spaced, parallel array by one or more grid members which serve to laterally support and position the fuel elements in the array. Mixing vanes, formed integrally on the grid members, serve to deflect the coolant flowing longitudinally past the fuel elements in a predetermined direction (i.e. laterally or diagonally across the array) to promote mixing and even heating of the coolant.

---

The present invention relates to a fuel assembly for a nuclear reactor and, more particularly, to the reduction of structural material in the fuel assembly and also improving the heat transfer between the nuclear fuel material and the coolant flowing through the fuel assembly while concurrently accommodating for differences in heat transfer along different coolant flow channels of each assembly and between adjacent assemblies.

In the invention of Tong and Berringer described in application Ser. No. 552,899, filed concurrently herewith, entitled, "Fuel Assembly for Nuclear Reactors," it has been pointed out that the use of mixing vanes serves an important role of reducing the enthalpy differences and differences in coolant temperature rise among the many coolant flow channels of each fuel assembly. The invention of Creagan and Frisch, Ser. No. 552,976, filed concurrently herewith, and entitled "Fuel Assembly for Nuclear Reactors," depicts the value of providing a new and improved fuel assembly wherein one of the features is the elimination of a can or peripheral enclosure of parasitic material. To incorporate the teachings of the Tong and Berringer invention into the Creagan and Frisch fuel assembly results in the provision of separate mixing grids formed from parasitic material which teaches a desirable mixing pattern within the fuel assembly. It is the purpose of this invention to still further reduce the amount of parasitic structural material within the fuel assembly by incorporating mixing means directly on predetermined ones of the positioning grids of the Creagan and Frisch fuel assembly. Furthermore, the mixing vanes of this invention are shaped in a new and improved manner to achieve the desired mixing path for the coolant flowing not only within each separate fuel assembly but also between adjacent fuel assemblies of the reactor core.

Accordingly, it is the general object of this invention to provide a new and improved nuclear fuel assembly which minimizes the parasitic structural material utilized therein while concurrently promoting the mixing of the coolant flowing therethrough.

A still further object of this invention is to provide a fuel assembly structure of minimized parasitic material which produces a lateral coolant flow between fuel assemblies.

Briefly, the present invention accomplishes the above cited objects by providing an elongated support means in the fuel assembly to vertically support the fuel elements or rods. A plurality of longitudinally spaced grids extend across and are secured to the elongated support means. The fuel rods, in turn, extend in a parallel array through openings in the grids and are vertically supported by the bottom end portion of the support means. Each grid has means for laterally positioning the fuel rods and predetermined ones of the grids have mixing vanes formed therein for laterally mixing the longitudinally flowing coolant. The lateral mixing of the coolant is accomplished by the mixing vanes protruding into the coolant flow channels formed along the spaced parallel array of fuel rods. The mixing vanes, which are integrally formed or secured to the grid, are disposed between the fuel rods and reflect the longitudinal coolant flow in a lateral or transverse direction thereby producing a mixing of the coolant among the longitudinal flow channels. Thus, the coolant in a flow channel having a higher enthalpy and/or temperature is mixed with the coolant in another flow channel having a lower enthalpy and/or temperature to produce a coolant mixture having an average enthalpy and/or temperature, which is intermediate the aforementioned higher and lower enthalpies and/or temperatures.

More specifically, the nuclear fuel assembly comprises an open elongated support means, a plurality of grids and a plurality of parallel fuel rods. The elongated support means, in turn, comprises a plurality of laterally spaced elongated support members or thimbles having their end portions secured to the transverse perforated end plates. The longitudinally spaced grids extends transversely of and are secured to the thimbles thereby adding rigidity to the entire support means. The fuel rods extend through the grid openings and in a parallel array, with the thimbles being parallel to and interspersed among the fuel rods. The fuel rods are disposed between the end plates and are vertically supported by the bottom end plate. The openings in the grid member are formed by a plurality of straps, which are interfitted to provide a structural network, similar to an "egg crate." The grid straps, in turn, are provided with at least resilient means for laterally engaging and positioning the fuel rods. Some or all of the grids are further provided with mixing vanes which protrude into their adjacent flow channels to laterally deflect the longitudinal coolant flow.

The mixing vanes may also be oriented to produce a transverse coolant flow across the entire fuel assembly. The mixing vanes may be further oriented to produce a free cross flow of coolant between adjacent fuel assemblies. This cross flow between fuel assemblies is now freely possible, because only elongated transversely spaced thimbles are utilized to give rigidity to the fuel assembly in lieu of elongated enclosures or cans which completely surrounded their fuel rods contained within a single fuel assembly. However, coolant cross flow between fuel assemblies is also possible if the cans have large openings in the vicinity of the mixing vanes.

In order to deflect the longitudinal coolant flow, each vane is cantilevered in a longitudinal direction from the edge of one of the grid straps. In addition, each vane is also bent at a predetermined angle from the vertical axis of the fuel assembly so as to protrude into at least one of the adjacent flow channels. Each vane is also located between adjacent fuel rods and therefore does not interfere with the passage of the fuel rods through the grid. Mixing vanes extend outwardly from both sides of a grid. Therefore, a completed grid has mixing vanes both above and below the grid.

These and other objects and advantages of the present invention will become more apparent when considered in view of the following detailed description and drawings, in which:

FIGURE 1 is a partially sectioned elevational view, with parts broken away for clarity, of a fuel assembly formed in accordance with the principles of this invention;

FIG. 2 is a plan view of FIGURE 1;

FIG. 3 is a partially cross sectioned view taken along reference line III—III of FIG. 1 with parts removed for clarity. FIG. 3 primarily shows an outline form in plan view of a mixing vane grid with upper mixing vanes illustrated but with lower mixing vanes omitted;

Figure 4:
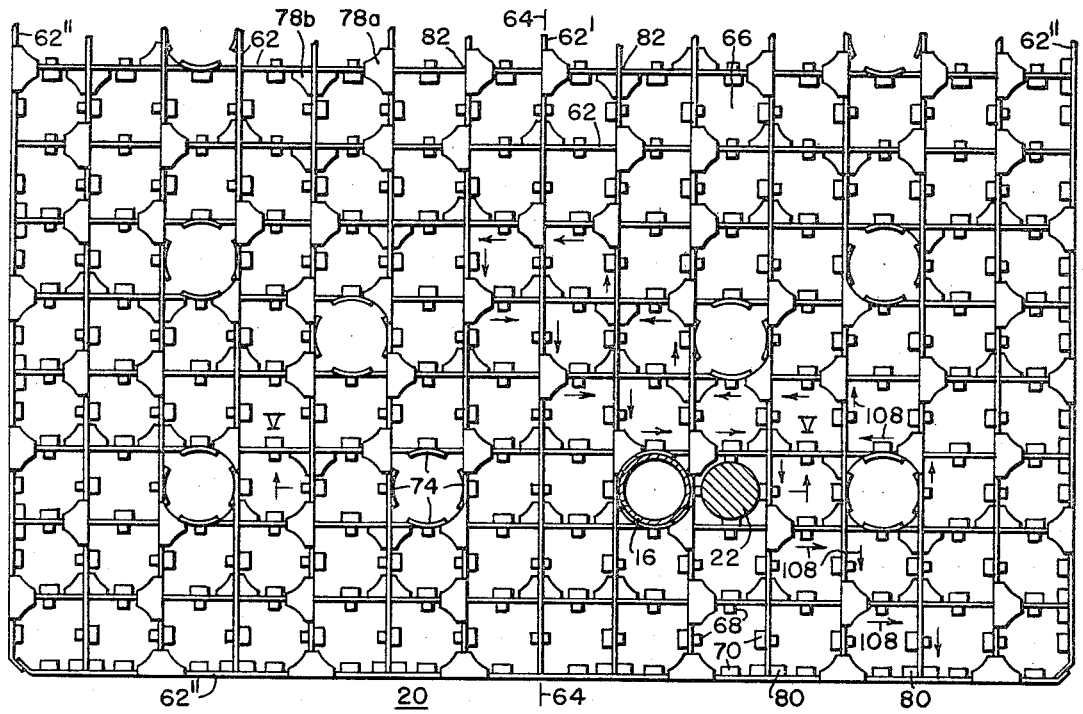
FIG. 4 is an enlarged portion of and is more detailed than FIG. 3, with some of the same parts being cross sectioned in both figures for orientation purposes and further showing a portion of the transverse coolant flow pattern.
Figure 5:
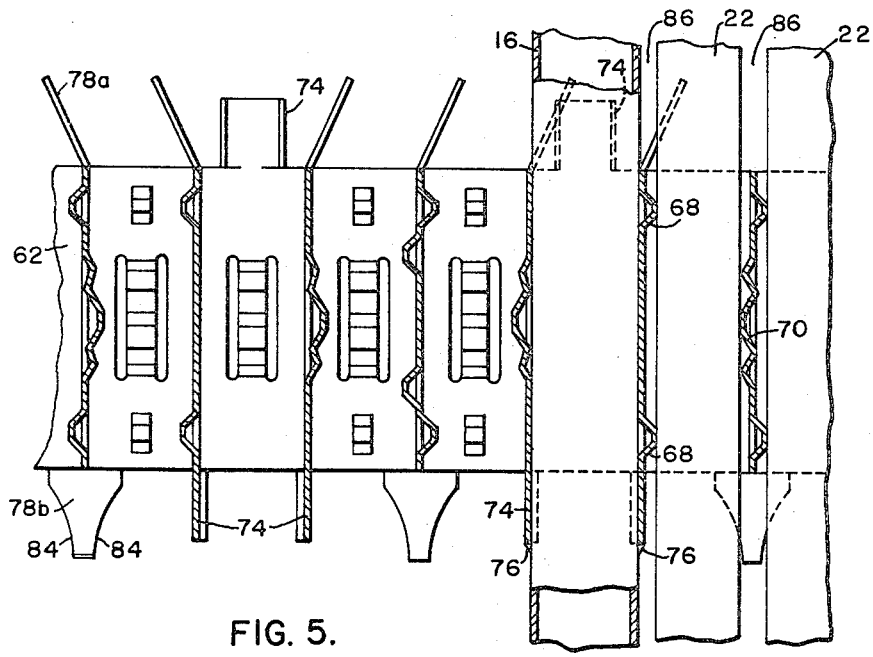
FIG. 5 is an enlarged partially sectioned elevational view of a portion of FIG. 4 and is taken along reference line V—V.
Figure 6:
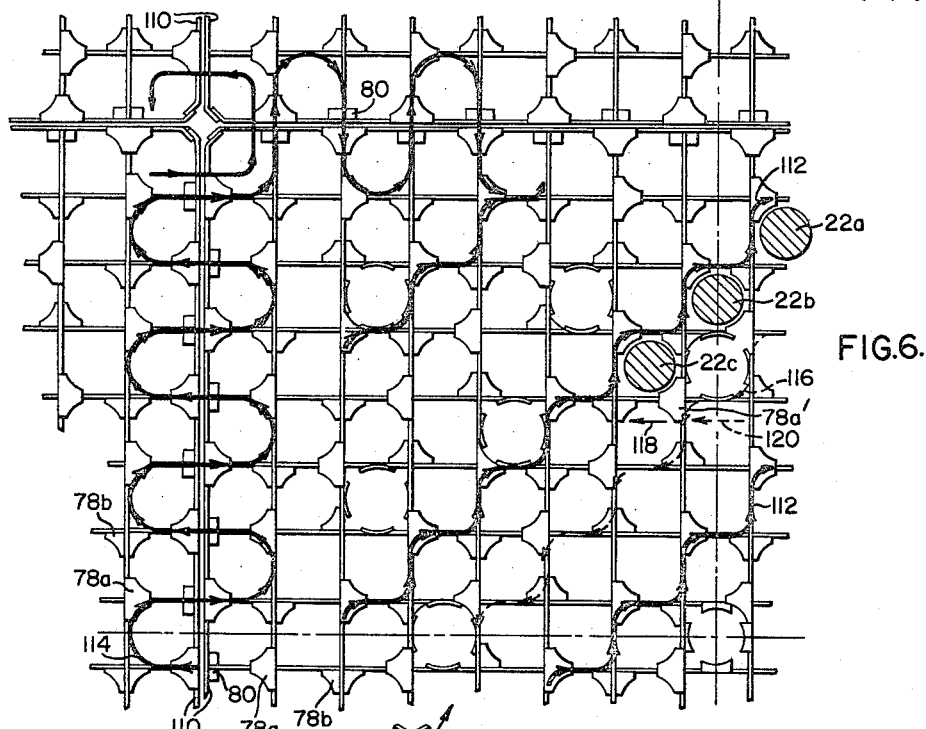
Figure 7:
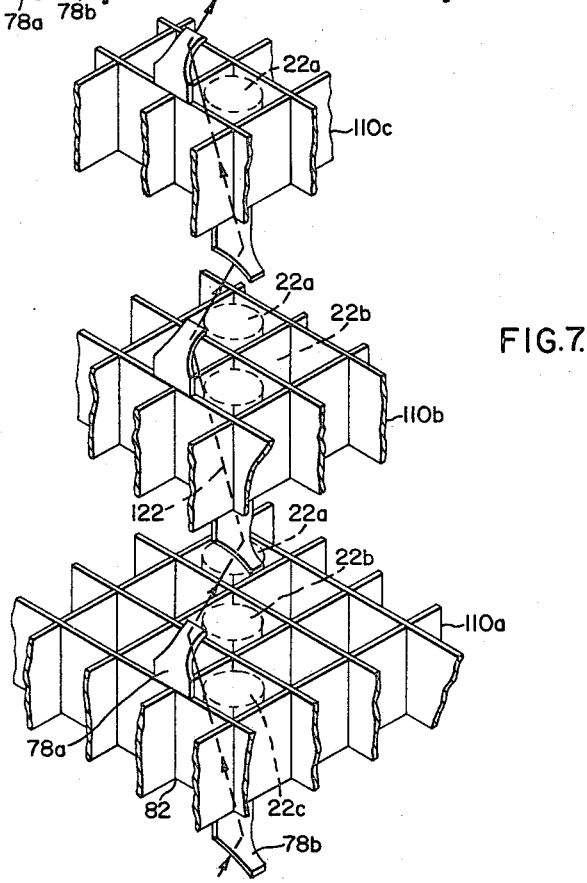

FIG. 6 is a plan view of one quarter of a grid having a different mixing vane pattern from that shown in FIG. 4 and is also a plan view of portions of three other adjacent grids. FIG. 6 further shows portions of generally diagonal transverse coolant flow paths and also shows a portion of the transverse weaving coolant flow path between adjacent grids; and FIG. 7 is an isometric view, with mixing vanes omitted for clarity, of portions of three vertically aligned grids showing the general coolant flow path as the coolant flows upwardly through the fuel assembly. The three fuel rods shown in FIG. 7 in dotted form represent the three cross sectioned fuel rods shown in FIG. 6 and are for orientation purposes.

Referring now to FIGS. 1 and 2 of the drawings, there is shown a fuel assembly 10 comprising an upper end structure 12, a lower end structure 14, a plurality of elongated support means or thimbles 16, a plurality of positioning grids 18, at least one positioning grid 20 having mixing vanes formed thereon, and a plurality of fuel elements or rods 22. To form fuel assembly 10, the longitudinally spaced grids 18 and 20 are first secured to the elongated support thimbles 16; the lower end structure 14 is then secured to the lower end portions of the thimbles; the fuel rods 22 are inserted through the grids 18 and 20 from above and are vertically supported by the lower end structure 14; and then the upper end structure is secured to the top end portions of thimbles 16.

Turning now to a description of each of the above mentioned individual components, the upper end structure 12 has a longitudinally disposed and rectangularly shaped upper end nozzle 24. An upper end plate 26, having a plurality of cross laced bars 28 which form openings 30, is secured to the bottom of the end nozzle 24. An annular flange 32 is secured to the top of the end nozzle 24. Flange 32 has an opening 34, which is sufficiently large to permit a rod cluster control assembly 36, to be described hereinafter, to pass through the opening 34 in a vertical direction. Two oppositely disposed leaf springs 38 are secured to the upper face of flange 32 by corner blocks 39 and screws 40. Each leaf spring 38 has a narrow end portion 42, which extends through a guide slot 44. Two other corner blocks 48 are diagonally disposed from each other and welded to the top surface of flange 32. Each block 48 has an opening 50, which extends through both the block 50 and the flange 32. Each opening 50 receives a dowel pin (not shown), which extends downwardly from an upper reactor core plate (not shown). After both the fuel assembly 10 and the upper core plate (not shown) have been inserted into their final position within the reactor core (not shown), the upper core plate is spacedly disposed from the upper surfaces of corner blocks 39 and 48 to allow for longitudinal expansion of the fuel assembly 10. In addition, the dowel pins (not shown) on the upper core plate extend downwardly into the openings 50 to provide lateral support for the fuel assembly 10. The upper core plate also deflects leaf springs 38 so as to preload the fuel assembly 10 sufficiently to prevent the fuel assembly from being moved upwardly by the hydraulic forces produced by an upwardly flowing coolant.

The lower end structure 14 has a longitudinally disposed and rectangularly shaped lower end nozzle 52, and the lower end nozzle 52 has four corner downwardly extending supports 54. Supports 54 are shaped similarly to the previously described blocks 39 and 48. Each of two diagonally disposed supports 54' has an opening 56 extending therethrough. The two openings 56 are longitudinally aligned with openings 50 located at the top of the fuel assembly 10. When the fuel assembly 10 is inserted into its reactor core (not shown), the four supports 54 rest on the lower core plate (not shown); and openings 56 received dowel pins (not shown) which extend upwardly from the lower core plate. Transverse bars 58 extend across the upper portion of the lower end nozzle 52, and the two end portions of each bar 58 are fitted into respective recesses 60 formed in the two oppositely disposed walls of the end nozzle 52 and are secured thereto.

As viewed in FIGS. 1, 3, 4 and 5, the fuel assembly 10 includes two types of positioning grids designated by the reference characters 18 and 20. The positioning grids 18, in this example, comprise the two lowermost grids and the uppermost grid of fuel assembly 10 and differ from the remaining positioning grids 20 in that the positioning grids 20 include mixing vanes formed thereon (as will be described) while the positioning grids 18 do not include mixing vanes thereon. Each positioning grid 20 is comprised of a plurality of straps 62 which are interwoven in a grid-like manner. In FIGS. 3 and 4 ticks 64 or straps 62' indicate the center lines of the mixing vane and positioning grid 20 and have been so designated for orientation purposes. The straps 62, which are interfitted to provide a structural network similar to an "egg crate," form a plurality of openings 66. The grid straps 62 are also provided with rigid and resilient means formed integrally therein and projecting into each opening 66 through which a fuel rod 22 passes. The rigid and resilient means support the fuel rods 22 against lateral displacement and, to a given extent, frictionally against longitudinal movement. The rigid means comprise two longitudinally spaced rigid projections 68 which engage the fuel rod on one side. The resilient means comprise a spring finger 70, which engages the fuel rod 22 on the side directly opposite to the rigid projections at a longitudinal point preferably midway between the rigid projections 68. Another identical set of lateral supports are formed in the other two straps, which form the opening 66, so as to support the fuel rods 22 at the same longitudinal location, but substantially perpendicular to the first set of lateral supports. Thus, a six point lateral support is provided for each fuel rod 22 at each opening 66 through which the fuel rod passes. For additional information on the six point lateral supporting grid, reference is made to copending application Ser. No. 458,634, entitled "Means for Supporting Fuel Elements in a Nuclear Reactor," filed May 25, 1965 by Harry N. Andrews and Herbert W. Keller, and also assigned to the present assignee.

The mixing vane and positioning grid 20 also provides openings 66 through which the thimbles 16 extend snugly against the walls of straps 62. Four arcuate tabs 74 extend longitudinally from the edges of the straps 62 adjacent to the thimble 16 and are form fitted to the periphery of the thimble. Two oppositely disposed tabs 74 extend upwardly from the grid straps 62, and two oppositely disposed tabs 74 extend downwardly from the straps 62. However, the top pair of tabs 74 are laterally disposed 90° apart from the lower pair of tabs 74. The thimbles 16 are secured to each tab 74 by a suitable means such as welds 76. In addition, each strap 62 of grids 20 has a plurality of upper and lower cantilevered mixing vanes 78a and 78b, respectively. Each of the mixing vanes 78 extend longitudinally outwardly from the edges of its associated strap 62 and also in the same vertical plane as that of strap 62. Each vane 78 is also deflected at an angle of approximately 20° to 40°, and preferably 28° to 30°, from the vertical plane of its associated straps 62. Each vane 78 is located at an intersection 82 of two straps 62, and each strap 78 has two arcuate portions 84 at its outer end to allow for the passage of adjacent fuel rods 22 through the mixing vane grid 20 without interfering with the mixing vane 78. However, the lower peripheral vanes 80 located on the peripheral straps 62' are more stubby in shape than mixing vanes 78, because the latter are used primarily for guiding purposes, to be described hereinafter. All vanes 78a and 80 on the peripheral straps 62" are bent towards the center of grid member 20 to prevent any protrusions outwardly of the peripheral straps 62". All of the other upper mixing vanes 78a are disposed on a first group of parallel straps 62, while all of the lower mixing vanes 78b are disposed on a second group of parallel straps 62 which are perpendicular to the first group. It is also to be noted that none of the upper mixing vanes 78a are located above any of the lower mixing vanes 78b or lower peripheral vanes 80. This is to prevent the need for splitting the mixing vane into two parts in order to permit the interfitting of the cross laced straps 62, as the straps 62 are interfitted through the use of opposing slots (not shown) which allows the straps 62 to be interlatched at their various intersections.

As pointed out above positioning grid 18 is substantially the same as mixing vane and positioning grid member 20, with all of the mixing vanes 78 removed with the exception of the upper mixing vanes 78a on the peripheral straps 62" and the lower peripheral vanes 80. The upper mixing vanes 78a and the lower peripheral vanes 80 are left on the positioning grid 18 to serve as guide means during the insertion of the fuel assembly 10 into the reactor core (not shown). Returning now to FIGS. 1 and 2, the positioning grid 18 is used for laterally positioning the fuel rods 22, while the mixing vane and positioning grid 20 is used both for laterally positioning the fuel elements 22 and also for the purpose of forcing a lateral flow of coolant between adjacent fuel elements 22 of each fuel assembly and between the fuel elements of adjacent assemblies thereby inducing coolant flow mixing between adjacent flow channels 86.

In assembling the fuel assembly 10, a plurality of longitudinally spaced grids 18 and 20 are secured to the parallel array of thimbles 16, which have been interspersed across the grids as shown in FIG. 3. In this embodiment, the grids 18 and 20 are located on a longitudinal pitch of approximately 11 inches, with a total of nine grids 18 and 20 being used. Although all nine grids can be either positioning grids 18 or mixing vane and positioning grids 20, in this embodiment three positioning grids 18 and six mixing vane grids 20 have been used, with the two lowermost grids and one uppermost grid being positioning grids 18. Mixing vane grids 20 were not used in lieu of the two lowermost positioning grids 18, because the coolant has a relatively low temperature in the lowermost region and does not require lateral mixing. The mixing vane grid 20 was not used at the upper portions of the fuel rods 22, because the coolant is reaching the end of its longitudinal travel through the fuel assembly 10 and does not have an appreciable temperature rise in the upper portion of the fuel assembly 10. Therefore, there is little requirement for any further lateral mixing in view of the mixing that has already occurred during the coolant's longitudinal passage through the fuel assembly 10.

After securing the grids 18 and 20 to the thimbles 16, the lower end structure 14 is attached to the lower end portions of the thimbles 16. Each thimble 16 has a plug 87 and a plug extension 88 at its lower end. Each extension 88 is inserted into its associated hole previously drilled through transverse bar 58. Each plug 87 rests on its associated transverse bar 58; and the extension 88 is welded to the transverse bar 58, as indicated by reference character 90. The fuel rods 22 are then inserted through the grids 18 and 20 and are vertically supported either by the transverse bars 58 or by the periphery of the lower end nozzle 52 upon which the fuel rods rods 22 rest.

The top of the upper end structure 12 is next secured to the upper end portions of the thimbles 16, by welding the thimbles 16 to bushings 92 which have been previously inserted through upper end plate 26 and secured thereto. Thus, each thimble 16 is secured to the lower end structure 14, to each of the grids 18 and 20, and to the upper end structure 12. It is to be noted that the upper end structure 12 is spacedly positioned from the top of the fuel elements 22 in order to allow for differential thermal expansion between the thimbles 16 and the fuel rods 22. Furthermore, cross bars 28 overlie the top of the fuel elements 22 to prevent any possibility of the fuel elements 22 from moving in an upwardly direction more than a predetermined amount.

In summary, the thimbles 16, the grids 18 and 20, and the end structures 12 and 14 have been joined into a continuous structure having a high rigidity. Furthermore, the overall stiffness of the fuel assembly 10 is increased when the fuel rods 22 are in place because of the friction generated between the fuel rods 22 and the lateral supporting means, for example the aforementioned six point lateral support.

It will be noted that great care has been taken to eliminate all edges on the outer periphery of the fuel assembly 10. This has been accomplished by chamfering all sharp edges, such as indicated by reference numerals 94 at the upper end structure 12 and 96 at lower end structure 14. Furthermore, there are no protrusions extending outwardly from the peripheral straps 62" on grids 18 and 20. In addition, the straps 62" have upper mixing vanes 78a and lower peripheral vanes 80, which are bent inwardly and are used for guiding purposes when the fuel assembly 10 is inserted into a reactor core along side of adjacent fuel assemblies. To further prevent the possibility of fuel assembly engagement with an adjacent fuel assembly when inserted into the core, the peripheral straps 62" are provided with beveled edges 98 between adjacent upper mixing vanes 78 and also between adjacent lower peripheral vanes 80.

The rod cluster control assembly 36 comprises a drive shaft 100 to which is secured a multi-fingered spider 102. A cluster of neutron absorbing rods 104 have their upper end portions secured to the spider 102. Each neutron absorbing rod 104 is longitudinally aligned with and moves vertically in its own associated tubular guide thimble 16, the latter forming part of the fuel assembly 10. The neutron absorbing rods 104 are located in a symmetrical pattern within a single fuel assembly 10, and their associated guide thimbles 16 replace fuel rods 22 within the lattice of the fuel assembly 10. The guide thimbles 16 also have lateral openings 106, which allow coolant to enter the lower portion of each guide thimble and flow upwardly between the guide thimble 16 and its associated neutron absorbing purposes during rapid emergency insertion of the control rod assembly. The drive shaft 100 is coupled to a control rod drive mechanism (not shown) mounted on the reactor vessel head (not shown) and is raised and lowered by the drive mechanism. Therefore, the entire cluster of neutron absorbing rods 104 move into and out of each fuel assembly 10 as a unit.

Most of the above-mentioned components are made of a corrosion resistant metal such as stainless steel or a zirconium based alloy. The neutron absorbing rods 104, in this example, are made of silver-indium-cadmium alloy rods hermetically sealed in a "free standing" stainless steel tube.

Returning now to FIG. 4, the lateral coolant flow pattern will be described. As the coolant flows upwardly through the fuel assembly 10 (FIG. 1), it comes in contact with the lower mixing vanes 78b and the upper mixing vanes 78a. Each mixing vane 78 then deflects the coolant flow in a lateral direction. When the coolant strikes a lower mixing vane 78b, the coolant is laterally deflected in a direction opposite to the inclination of the mixing vane 78b, for example as indicated by flow arrows 108'. If the coolant strikes an upper mixing vane 78a, the coolant is deflected in the same direction as the inclination of the upper mixing vane 78a, for example as indicated by lateral flow arrow 108''. The orientation of the mixing vanes 78 shown in FIG. 4 is designed to produce a generally diagonally later flow into and out of mixing vane grid 20, for example, as shown by flow arrows 108. In any event, the coolant flowing longitudinally through the fuel assembly 10 is forced from one flow channel 86 (FIG. 1) to another flow channel 86 thereby inducing coolant mixing between adjacent flow channels 86. If FIG. 3 is compared with FIG. 4, it will be noted that the mixing vane pattern for the portion of the mixing vane grid 20 not shown in FIG. 4 is exactly the same as that portion shown in FIG. 4, when the latter is laterally rotated 180° around the center line of fuel assembly 20, i.e. strap 62'.

Referring now to FIG. 6, there is shown portions of adjacent mixing vane grids 110, which are similarly constructed to mixing vane grid 20 but have a different mixing vane pattern. In this example, the mixing vanes 78 produce a lateral flow path, as indicated by representative flow line 112, which extends in a generally diagonal direction across the mixing vane grid 110. Also shown therein is a lateral flow line 114, which weaves back and forth between adjacent fuel assemblies 110. Lateral flow lines 112 and 114 indicate the forced lateral flow produced by the mixing vanes 78 and aided by lower peripheral vanes 80. However, the mixing vanes 78 also produce an induced flow path as indicated by dotted lateral flow line 116, which is intermediate to the forced lateral flow lines 112 and in the opposite direction. When upwardly flowing coolant strikes mixing vane 78a', the coolant will be deflected to the left of the mixing vane as indicated by flow arrow 118. The aforementioned lateral displacement of coolant produces a lower pressure to the right of mixing vane 78a' than to the left of mixing vane 78a'. Therefore, upwardly flowing coolant to the right of mixing vane 78a' will be induced to flow laterally to the left, as indicated by dotted flow arrow 120, until the pressure across the mixing vane 78a' is equalized. A similarly induced flow is produced by the lower mixing vanes 78b and thus a representative induced lateral flow path 116 is created. Thus, one can readily see that considerable mixing of the coolant between adjacent flow channels will occur, and thereby provide approximately the same coolant temperature across the mixing vane grid 110.

Referring now to FIG. 7, there is shown the coolant flow path, as indicated by dotted line flow path 122, as the coolant flows longitudinally upwardly through successively higher mixing vane grids 110a, 110b, and 110c. The locations of fuel elements 22a, 22b and 22c in FIG. 7 are also shown in the plan view of FIG. 6. Thus, a representative portion of the lateral flow line 112 has been incorporated with the vertical longitudinal flow to show one possible resultant flow that would occur by combining the lateral flow component with the longitudinal flow component. It will be appreciated that dotted line flow path 122 shows a resultant flow path when longitudinal and lateral flow components are combined. FIG. 7 shows clearly how the coolant is deflected by the mixing vane 78 from one flow channel into another flow channel thereby creating coolant mixing. Specifically, if one looks at mixing vane grid 110a, the coolant flow is adjacent to fuel rod 22c. However, by the time the coolant flows longitudinally through mixing vane grid 110b and mixing vane grid 110c, the coolant flow has been laterally deflected past fuel rod 22b and also past fuel rod 22a.

It will be appreciated that the combination of mixing vanes with fuel rod positioning means adds essentially no parasitic material to the reactor core. In addition, the fuel rods are now more stiffly supported. Such support has a tendency to raise the natural frequency of the fuel rods on the elastic supports thus making it less sensitive to flow induced vibrations. Also, the mixing vanes increase the core capability due to the reduced enthalpy rise of the coolant.

Various modifications may be made within the spirit of the invention. For example, many different mixing vane patterns can be developed to produce many different types of lateral flow patterns. If desired, mixing vanes need not be used both above and below the grid member, but may be used only on one side. The shapes and locations of mixing vanes may also be altered.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

What is claimed as new is:

1. A fuel assembly for a nuclear reactor comprising a plurality of elongated fuel elements disposed in a generally parallel array and forming a plurality of longitudinal coolant flow channels, a plurality of spaced grid structures disposed in longitudinally spaced relationship along said fuel elements and extending laterally therefrom, said grid structures having aligned openings through which said fuel elements extend and having portions thereof in each of said flow channels, means for supporting said fuel elements and said grid structures, said grid structures having positioning means extending into at least some of said fuel element openings for laterally positioning said fuel elements, and means mounted on at least some of said grid structures for laterally deflecting at least a portion of a generally longitudinally coolant flow between at least adjacent flow channels.

2. The fuel assembly of claim 1 wherein said coolant deflecting means is shaped to deflect at least a portion of said coolant laterally across at least a portion of said fuel assembly as said coolant flows generally longitudinally through said fuel assembly.

3. The fuel assembly of claim 2 wherein said coolant deflecting means is shaped to deflect at least a portion of said coolant in a generally diagonal direction across at least a portion of said fuel assembly.

4. The fuel assembly or claim 1 wherein each of said same grid structures comprises a plurality of rigidly interengaged straps, said straps forming said portions of said flow channels, and wherein said coolant deflecting means are coolant mixing vanes cantilevered longitudinally from the edges of said straps and protruding into said flow channels.

5. A grid structure for a nuclear reactor fuel assembly containing a plurality of elongated fuel elements in a generally parallel array, said grid structure comprising a plurality of connecting members forming respective openings through which said fuel elements are adapted to extend, a plurality of coolant deflecting means cantilevered from said connecting members and protruding over some of said openings at a predetermined angle from said fuel elements, and said grid structures having positioning means extending into at least some of those openings receiving said fuel elements for laterally positioning said fuel elements.

6. The grid structure of claim 5 wherein said acute angle is from 20° to 40°.

7. The grid structure of claim 5 wherein said connecting members are cross-laced rigidly interengaged straps, and wherein said coolant deflecting means are vanes disposed at the intersections of said straps.

8. The grid structure of claim 5 wherein said connecting members are cross-laced rigidly interlatched straps, and wherein said coolant deflecting means are vanes disposed on the upper and lower sides of said grid structure.

9. The grid structure of claim 8 wherein said upper vanes are disposed on one group of parallel straps, and the lower vanes are disposed on another group of straps perpendicular to said one group of straps.

10. The grid structure of claim 9 wherein the upper vanes are disposed at one group of intersections, and the lower vanes are disposed at another group of intersections.

11. The grid structure of claim 10 wherein all of the vanes at the periphery of said grid structure are deflected laterally inwardly of said straps.

12. The grid structure of claim 7 wherein each of said vanes are bent in a plane containing a line which is parallel to the strap from which the vane is bent.

13. The grid structure of claim 12 wherein each of said vanes is narrower at its outward end than at the strap, each of said vanes has two arcuate portions at its outward end, and said outward end extends over a strap perpendicular to the strap from which said vane is cantilevered.

References Cited
UNITED STATES PATENTS

| | | | |
|---|---|---|---|
| 3,068,163 | 12/1962 | Currier et al. | 176—78 |
| 3,070,537 | 12/1962 | Treshuw | 176—61 X |
| 3,205,147 | 9/1965 | Foure et al. | 176—64 X |
| 3,255,091 | 6/1966 | Frisch | 176—78 |
| 3,308,031 | 3/1967 | Pon | 176—78 X |
| 3,344,855 | 10/1967 | Clark | 176—78 X |

FOREIGN PATENTS
1,014,822  12/1965  Great Britain.

BENJAMIN R. PADGETT, *Primary Examiner*

CARL D. QUARFORTH, *Examiner.*

M. J. SCOLNICK, *Assistant Examiner.*